May 22, 1945.  W. J. MATTOX  2,376,709
PRODUCTION OF STYRENE
Filed Feb. 11, 1942
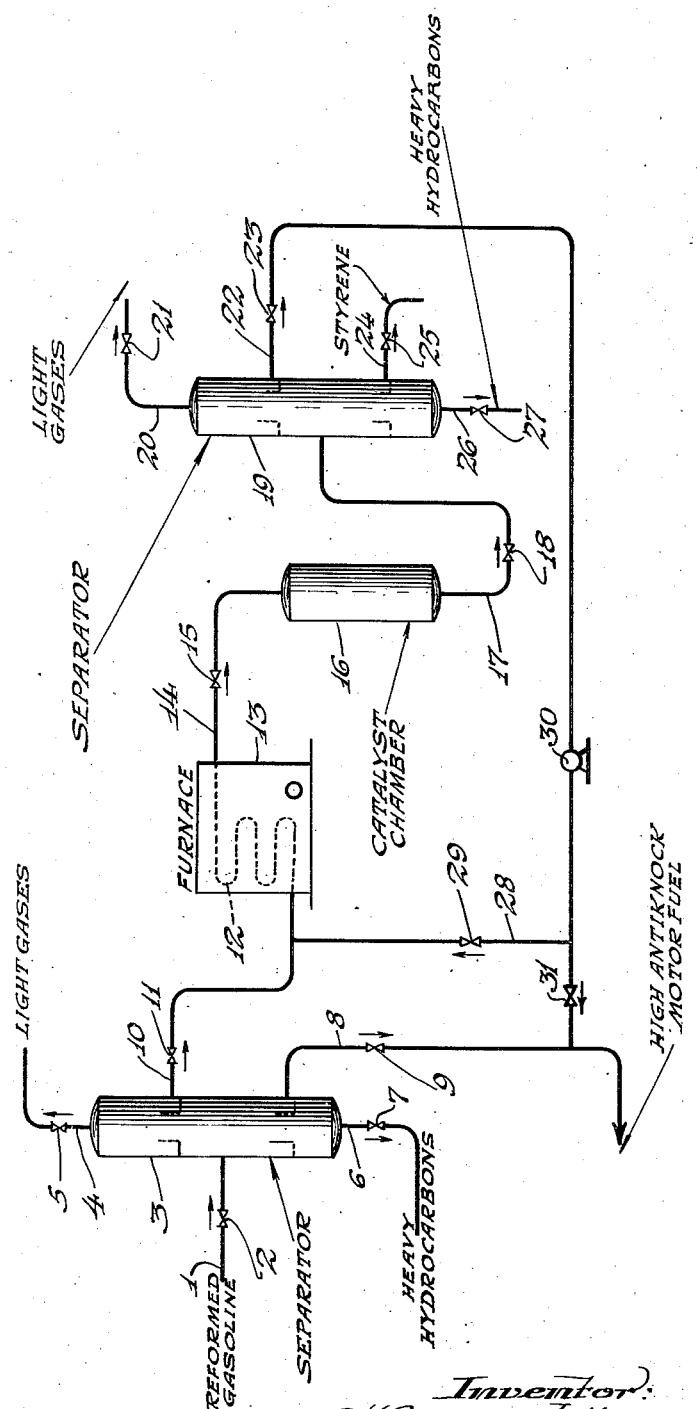

Patented May 22, 1945

2,376,709

UNITED STATES PATENT OFFICE 2,376,709

PRODUCTION OF STYRENE

William J. Mattox, Chicago, Ill., assignor to Universal Oil Products Company, Chicago, Ill., a corporation of Delaware Application February 11, 1942, Serial No. 430,497

7 Claims. (Cl. 260—669)

The present invention relates to the production of styrene by the catalytic dehydrogenation of a specific hydrocarbon fraction obtained in the reformation of a straight-run gasoline. More specifically, this invention is concerned with the catalytic dehydrogenation of said fraction with a particular type of catalyst and under definite conditions of operation.

In recent years processes for the production of alkyl aromatics have become increasingly important. These compounds have been found to be particularly suitable as a starting material for many organic syntheses wherein high molecular weight polymers are formed which may be utilized in the paint, varnish, plastic and synthetic rubber industries.

The product of the process herein disclosed is particularly adaptable to the production of synthetic rubber, principally by the polymerization of said product with conjugated diolefinic hydrocarbons, such as butadiene, to produce a high molecular weight polymer having very highly desirable physical properties similar and in some respects superior to those of natural rubber.

The invention herein disclosed is primarily concerned with the catalytic dehydrogenation of ethyl benzene in the presence of an inert diluting medium, in this case xylene.

The particular charging stocks which may be used in this process are selected fractions of ethyl benzene and para and meta xylene which are obtained by the reformation of straight-run gasolines either catalytically or thermally with or without the addition of hydrogen into the reaction zone wherein the anti-knock value of said straight-run gasoline is substantially increased with a moderate loss in liquid volume.

In one specific embodiment, the present invention discloses a process for the production of styrene from a mixture of ethyl benzene and xylene which comprises contacting the vapors of said mixture with a dehydrogenation catalyst under conditions of operation adequate to produce a substantial yield of styrene.

One of the essential features of the present invention is the dehydrogenation of the ethyl benzene in the presence of xylene, which is inactive under the conditions of operation utilized for the dehydrogenation of the ethyl benzene. This reaction is ordinarily conducted under a high vacuum, but the presence of the xylene in the reaction mixture substantially decreases the partial pressure of the ethyl benzene present and permits the conduction of the operation under a higher total pressure.

Another advantage obtained by the presence of xylene is the prevention of any interaction between the more reactive styrene molecules, thereby substantially decreasing the amount of undesirable heavy materials produced as a result of the operation. The use of xylene as the diluting or spacing medium is particularly advantageous since it is ordinarily found in substantial portions in the reformate resulting from processing a straight-run gasoline to increase its anti-knock value and since the ethyl benzene and xylene have boiling points which are quite similar, it may be removed in a selected fraction containing the ethyl benzene. The fact that the xylene does not undergo any particular reaction during the dehydrogenation treatment of ethyl benzene permits the recirculation of said xylene back to the reaction zone if a greater dilution is desired. Further advantages of the present invention will be apparent by the description of the accompanying diagrammatic sketch which illustrates the conventional side elevation, one type of apparatus in which the objects of the present invention may be accomplished.

Referring to the drawing, the charging stock, for example, the reformate from a catalytic hydro-forming operation, is introduced through line 1 containing valve 2 into separator 3, wherein the desired ethyl benzene-xylene fraction is separated from the lighter and heavier materials. The light gases are removed through line 4, containing valve 5, and may be recycled back to the catalytic hydro-forming step or may be recovered as a product of the operation. The heavier hydrocarbons boiling within the gasoline range are withdrawn through line 8, containing valve 9, and may be combined with xylene obtained as hereinafter set forth. The heavier hydrocarbons boiling outside the gasoline range are removed through line 6, containing valve 7, and may be thermally or catalytically treated to augment the overall gasoline yield.

The desired ethyl benzene-xylene fraction withdrawn through line 10, containing valve 11, is directed into heating coil 12 disposed in furnace 13 wherein it is raised to a temperature high enough to compensate for any loss of heat by conduction or radiation during the passage of said hydrocarbon fraction through line 14, containing valve 15 into catalyst chamber 16. This selected fraction obtained through line 10, containing valve 11, will be composed primarily of ethyl benzene and para and meta xylene, since the ortho xylene hydrocarbon boils approximately 6° C. higher than its para and meta isomers and will be withdrawn with the remaining gasoline boiling range materials through line 8, containing valve 9. The catalyst disposed in chamber 16 will comprise any of the dehydrogenating catalysts well known to those skilled in the art, such as alumina, either alone or promoted by the deposition thereon of small amounts of the oxides of the left hand members of groups 4, 5 and 6. Although these catalysts are not necessarily equivalent in their ability to direct the desired reaction, any variations in catalyst activity can be compensated by variations in the processing conditions to produce the desired results. Particularly desirable catalysts are those comprising alumina promoted by small amounts of the oxides of at least one of the elements selected from the group consisting of chromium, molybdenum and vanadium. These catalysts may be used in the powdered, pelleted or granular form, either disposed in a fixed bed or fluidized by the passage of the reactants upwardly through the catalyst mass.

In order to simplify the drawing only one catalyst chamber is shown. However, it is ordinarily desirable to utilize two or more in order to have a substantially continuous operation. In this manner of operation the catalyst mass disposed in each reaction zone will be alternately contacted with the reactants and the regenerating medium. The conditions of temperature and pressure utilized in catalyst chamber 16 will vary, depending upon the charging stock and the particular type of catalyst used. However, most suitable temperatures will ordinarily fall within the range of about 450 to about 700° C. and under pressures varying from approximately 0.25 atmosphere to slightly super-atmospheric.

The contact times will vary, depending upon the temperature and activity of the catalyst, but will ordinarily be quite short in order to prevent any extensive decomposition. This contact time will be dependent upon the ratio of the xylene to ethyl benzene, longer contact times being used with higher ratios of xylene to ethyl benzene.

The reaction products comprising styrene, small amounts of unconverted ethyl benzene and the unreacted xylene will be removed through line 17, containing valve 18, and are directed into separator 19 wherein the desired styrene is separated from the remaining reaction products.

The light gaseous hydrocarbons formed by the dehydrogenation reaction will be removed through line 20, containing valve 21, and may be recycled back to the catalytic reforming operation or recovered as a product of the reaction. The xylene containing small portions of unconverted ethyl benzene will be removed through line 22, containing valve 23, and is introduced into the suction side of pump 30 which will discharge thru valve 31 and blending the xylene with the anti-knock motor fuel being withdrawn from separator 3 through line 8, containing valve 9, and considerably increasing the anti-knock value of said gasoline. A portion of the xylene may be directed through line 28, containing valve 29, into line 10 to effect further dilution of the ethyl benzene-xylene fraction being catalytically dehydrogenated. The desired styrene is withdrawn through line 24, containing valve 25, and is recovered as a product of the reaction. Small amounts of heavy polymers which are formed during the dehydrogenation may be withdrawn through line 26, containing valve 27, and treated either catalytically or thermally to augment the overall gasoline yield.

In order to simplify the explanation of the drawing, the separating steps have been shown as single fractionators. However, it is not intended to limit this invention, since any suitable means of separation, such as solvent extraction, azeotropic distillation and chemical separation are included within its general broad scope.

*Example*

The reformate resulting from the catalytic hydro-forming of a straight-run naphtha obtained by the distillation of a Michigan crude is fractionated to produce an ethyl benzene-xylene fraction containing about 25 percent ethyl benzene. The vapors of said fraction are then contacted with a catalyst comprising molybdenum oxide on alumina at a temperature of about 600° C. and under a pressure of 0.32 atmosphere absolute. The resulting reaction products are separated into three fractions, the hydrogen and small amounts of light uncondensable gases, the styrene fraction and the unconverted ethyl benzene in admixture with the xylene. The styrene production amounts to approximately 60 percent by volume of the original ethyl benzene charged to the dehydrogenating zone.

I claim:

1. A process for the production of styrene from a mixture of ethyl benzene and xylene which comprises contacting said mixture with a dehydrogenating catalyst under operating conditions adequate to produce a substantial conversion of the ethyl benzene contained therein to styrene.

2. A process for the production of styrene from a mixture of ethyl benzene and xylene which comprises contacting said mixture with a dehydrogenating catalyst at a temperature of about 450 to about 700° C. and under a pressure of from approximately 0.25 atmosphere to slightly super-atmospheric.

3. A process for the production of styrene from a mixture of ethyl benzene and xylene which comprises contacting said mixture with a catalyst comprising alumina promoted by a dehydrogenating metal oxide under operating conditions adequate to substantially convert the ethyl benzene contained therein to styrene.

4. A process for the production of styrene from a mixture of ethyl benzene and xylene which comprises contacting said mixture with a catalyst comprising alumina promoted by a dehydrogenating metal oxide at a temperature of about 450 to about 700° C. and under a pressure of from approximately 0.25 atmosphere to slightly super-atmospheric.

5. A process for the production of styrene from a mixture of ethyl benzene and xylene which comprises contacting said mixture with a dehydrogenating catalyst under operating conditions adequate to produce a substantial conversion of the ethyl benzene contained therein to styrene, separating the styrene from the unconverted materials and recycling regulated amounts of said unconverted materials containing the xylene therein back to the dehydrogenating zone.

6. A process for the production of styrene from a mixture of ethyl benzene and xylene which comprises contacting said mixture with a catalyst comprising alumina promoted by a dehydrogenating metal oxide at a temperature of about 450 to about 700° C. and under a pressure of from approximately 0.25 atmosphere to slightly superatmospheric, separating the styrene from the unconverted materials and recycling regulated portions of said unconverted materials containing the xylene therein back to the dehydrogenating zone.

7. A process for producing styrene from ethyl benzene which comprises subjecting said ethyl benzene in admixture with xylene to the action of a dehydrogenating catalyst under conditions such that the ethyl benzene is converted to styrene leaving the xylene substantially unconverted.

WILLIAM J. MATTOX.